Patented Jan. 16, 1945

2,367,324

UNITED STATES PATENT OFFICE 2,367,324

PREPARATION OF GLYCOLS

Erving Arundale, Colonia, and Louis A. Mikeska, Westfield, N. J., assignors to Standard Oil Development Company, a corporation of Delaware No Drawing. Application December 28, 1940, Serial No. 372,170

6 Claims. (Cl. 260—635)

The present invention relates to a method for the production of polyhydric alcohols or their derivatives from cyclic acetals or substituted cyclic acetals by halohydrolyzing the latter in the presence of water or dilute aqueous alkali:

1,3-propanediol has been obtained by the fermentation of by-product glycerol and fermentation of glucose. 1,3-butanediol has been prepared by the reduction of acetaldol and by the action of mangnesium amalgam on aqueous acetaldehyde. Higher members of the series can be prepared by similar reactions from the appropriate aldehydes or aldols. However, these synthetic methods cannot be considered to be on a commercial basis. It has also been proposed, as in U. S. Patent 2,143,370, to produce 1,3-butanediol by reacting propylene with formaldehyde-hydrate at approximately 70° C., under pressure, and in the presence of hydrogen chloride gas. In this latter process, the yields of 1,3-butanediol are low, due to the formation of beta-chlorobutanol and other by-products.

One object of the present invention is the provision of a method whereby polyhydric alcohols can be prepared from readily available cyclic acetals in a simple manner and in high yields. This and other objects will be readily apparent to those skilled in the art after reading the ensuing disclosure.

The process of this invention was discovered unexpectedly in the course of experiments on the halogenation of cyclic acetals. The halogenation was found to go in a normal manner when a solution of the cyclic acetal in an organic solvent was treated with a halogen as in British Patent 511,861. However, in studies carried out on the halogenation of other organic compounds, it had been found that the halogenation reaction could be more readily controlled when it was run in the presence of water. Consequently, experiments were made in the halogenation of cyclic acetals, but, instead of halogenation as such, halohydrolysis resulted, yielding reaction products containing no halogen and no cyclic structure. Incidentally, the term "halohydrolysis" is used herein to convey the concept of halogenation with immediate or simultaneous hydrolysis.

In U. S. Patent 2,122,813 dioxolanes (cyclic acetals possessing a five-membered ring) are converted to glycols. In a process such as is there described, temperatures of at least 50° C. are required for the reason that in the presence of ordinary acid catalysts there is little or no hydrolysis at room temperature whereas in the process of the present invention, room temperature and even lower temperatures are quite satisfactory. Furthermore, the process of the patent depends upon the establishment of an equilibrium between glycol, dioxolane and liberated aldehyde. The yield of glycol from this reaction is therefore limited in amount by the conditions of equilibrium produced. In the present invention, however, the conditions of equilibrium are disrupted by the oxidation of the aldehyde to the corresponding acid and a higher yield of glycol is secured.

Thus, according to the present invention, polyhydric alcohols, of which the 1,3-alkanediols are representative, are prepared from cyclic acetals, such as meta-dioxane and dioxolanes. The meta-dioxanes are cyclic acetals possessing six-membered rings and having the following general formula:

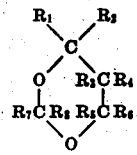

where $R_1$, $R_2$, $R_3$, $R_4$, $R_5$, $R_6$, $R_7$, and $R_8$ are hydrogen or halogen atoms, alkyl, alkenyl, aryl, aralkenyl, alicyclic, aralkyl, or alkaryl radicals, or substituted derivatives thereof, such as haloalkyl, alkoxy, aryloxy, carbalkoxy, hydroxyalkyl radicals, and the like.

The meta-dioxanes, on halohydrolysis, yield 1,3-diols or substituted derivatives thereof. Thus, when a meta-dioxane has a substituent containing a double bond between a pair of carbon atoms, the product derived from said meta-dioxane by halohydrolysis is an unsaturated dihydric alcohol. Dioxolanes (cyclic acetals containing five-membered rings) yield 1,2-diols or substituted derivatives thereof on halohydrolysis.

Examples of the cyclic acetals which are capable of being converted into polyhydric alcohols by the reaction of the present invention are as follows (the numbering of the atoms composing the meta-dioxane and dioxolane rings is indicated in the following skeleton formulae:

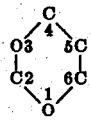

and

respectively); 4,4-dimethyl meta-dioxane; 2,4,4,6-tetramethyl meta-dioxane; 2,6-di-isopropyl-4,4-dimethyl meta-dioxane; 4-methyl meta-dioxane; 2,4,4-trimethyl meta-dioxane; 2,6-diphenyl-4,4-dimethyl meta-dioxane; 2,2,4,4,5,6,6-heptamethyl meta-dioxane; 4,5-dimethyl meta-dioxane; 4-methyl-4-vinyl meta-dioxane; 4,4,5-trimethyl meta-dioxane; 4-propyl meta-dioxane; 2,4,4,5,6- pentamethyl meta-dioxane; 4-methyl-4-ethyl meta-dioxane; 4,4-diethyl meta-dioxane; 4,4-dimethyl-5-tert-butyl meta-dioxane; 4-methyl-4-neopentyl meta-dioxane; 4-methyl-4-phenyl meta-dioxane; 4,5-cyclohexo meta-dioxane; 4-methyl-4-ethoxyethyl meta-dioxane; 4,4-dimethyl-5-chloro meta-dioxane; 4-methyl-5-chloro meta-dioxane; 4-methyl-4-chloromethyl meta-dioxane; 2,4,4,5,5-pentamethyl dioxolane, etc.

Representative examples of the polyhydric alcohols which may be prepared by the process of the present invention are as follows: 3-methyl-1,3-butanediol; 2-methyl-2,4-pentanediol; 2,5-dimethyl-2,4-hexanediol; 1,3-butanediol; 1-phenyl-3-methyl-1,3-butanediol; 2-methyl-1,3-butanediol; 2,3,4-trimethyl-2,4-pentanediol; 3-vinyl-1,3-butanediol; 2,3-dimethyl-1,3-butanediol; 1,3-hexanediol; 2,3-dimethyl-2,4-pentanediol; 3-methyl-1,3-pentanediol; 3-ethyl-1,3-pentanediol; 2-isobutyl-3-methyl-1,3-butanediol; 3,4,4-trimethyl-1,3-pentanediol; 3-phenyl-1,3-butanediol; hexahydrosalicyl alcohol; 3-ethoxyethyl-1,3-butanediol; 2-chloro-3-methyl-1,3-butanediol; 3-methyl-4-chloro-1,3-butanediol; tetramethyl glycol, etc.

The reaction of the present invention is one of halohydrolysis in which cyclic acetals are converted into polyhydric alcohols by the action of a halogen in the presence of water or a dilute aqueous solution of an alkali. Equations for this reaction may be written, for example, as follows:

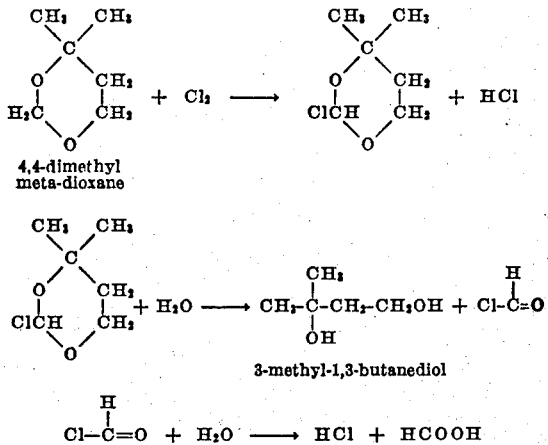

4,4-dimethyl meta-dioxane 3-methyl-1,3-butanediol $Cl-CH=O + H_2O \longrightarrow HCl + HCOOH$ In general, the reaction is carried out by mixing a cyclic acetal with water or dilute, aqueous alkali and then adding halogen to the mixture until no more halogen is absorbed. The reaction product is then neutralized, and the neutralized mixture is vacuum-distilled to remove the water contained therein. The distillation residue is contacted with a solvent, such as absolute alcohol, and the resulting solution is separated from the solid salts contained in the distillation residue by filtration. The filtrate is distilled to remove the solvent, and the residue is subjected to vacuum-distillation in order to obtain the desired polyhydric alcohol as an overhead product free from impurities. The polyhydric alcohol is completely soluble in water and phosphoric acid, and is vigorously reactive with sodium when heated therewith. The polyhydric alcohol contains no trace of the halogen used.

For best results in this reaction, the halogen/cyclic acetal and water/cyclic acetal mol ratios should be at least 1/1 and 2/1, respectively. An alkali, such as sodium carbonate, may be included in the reaction mixture for the purpose of neutralizing the acid by-products as they are formed.

The reaction should be conducted in a closed vessel equipped with suitable agitation means in order to insure adequate contact between the halogen and the cyclic acetal. The reaction is fairly rapid and is generally completed in one-half to three hours. The reaction may be carried out at temperatures ranging from −50° C. to +50° C., temperatures within the range of 2° to 5° C. being preferred when a cyclic acetal possessing a tertiary ring carbon atom is being converted into the corresponding polyhydric alcohol. In general, it is preferred to use a slightly higher reaction temperature in the case of cyclic acetals possessing a secondary ring carbon atom.

A pure cyclic acetal or a neutralized, crude product of the reaction of an olefin with an aldehyde in the presence of an acid-reacting catalyst (such reactions are disclosed in copending application No. 334,668, filed in the name of J. J. Ritter on May 11, 1940) may be used as the starting material for the reaction of the present invention.

It is within the scope of this invention to halogenate a cyclic acetal in the presence of water, and when the cyclic acetal is substantially reacted, the reaction temperature is raised and conjugated diolefins produced by the dehydration of the resulting glycols are taken off as formed. The halogenation reaction may also be run under such conditions that diolefins are produced directly.

Another modification of the invention is that the cyclic acetal may be agitated with an aqueous solution of an inorganic halide which is being electrolyzed. The inorganic halide is converted to a halogen and an alkali hydroxide. The halogen converts the cyclic acetal to a diol and hydro halogen acid and organic acids are also formed. The alkali hydroxide produced during electrolysis neutralizes the organic and inorganic acids and thus disturbs the reaction equilibrium. Instead of halogens, compounds which are capable of liberating halogens under the reaction conditions may be used.

The following examples are given for the purpose of illustrating the invention:

*Example 1*

88 parts by weight of 4,4,5-trimethyl meta-dioxane and 500 parts by weight of water were stirred together in a closed container, and the mixture was cooled to between 2° and 5° C. Chlorine gas was then slowly passed into the stirred mixture over a period of 2.5 hours. 36 parts by weight of chlorine were absorbed in the reaction mixture during this period, and the reaction mixture had become homogeneous (one liquid phase). The reaction mixture was neutralized, the neutralized mixture was extracted with ether, and the extract was dried over potassium carbonate. The dried extract was separated from the drying agent by filtration, and was then vacuum-distilled under a pressure of 3 mm. of mercury. The ether and a small amount of unreacted meta-dioxane were obtained as the distillate. 55 parts by weight, representing a 68% yield, remained as a residue. This residue was 2,3-dimethyl-1,3-butanediol, which on redistillation boiled at 103°–105° C. at 3 mm. pressure. The diol was completely soluble in water and phosphoric acid, was vigorously reactive with sodium when heated therewith, and contained no chlorine.

Example 2

Chlorine gas was passed into a stirred mixture of 1.3 mols of 4,4-dimethyl meta-dioxane and 36 mols of water which was maintained at a temperature between 2° and 8° C. After 37 minutes, the absorption of chlorine by the reaction mixture was very slow and its passage into the reactor was stopped. 1.18 atoms of chlorine were absorbed in the reaction mixture during this period. In order to obtain material balance data on the acids formed in this reaction, a sample of the reaction mixture was titrated with a standard alkali solution, and the normality of the mixture was found to be 1.92. Another sample of the reaction mixture was titrated with a standard silver nitrate solution, and the normality of the HCl present in the reaction mixture was found to be 1.39. The difference in the normalities (0.53) was due to organic acidity. The reaction mixture was then neutralized and vacuum distilled. 0.7 mol of the meta-dioxane was recovered along with 0.394 mol of 3-methyl-1,3-butanediol. The following table summarizes the results of the experiment:

| | |
|---|---|
| Moles meta-dioxane consumed | 0.6 |
| Per cent meta-dioxane conversion | 46 |
| Atoms chlorine absorbed | 1.18 |
| Mols hydrochloric acid produced | 1.19 |
| Mols organic acid recovered | 0.456 |
| Mols glycol recovered | 0.394 |
| Per cent glycol yield (on dioxane converted) | 66 |

The meta-dioxane and water are immiscible which causes poor contact between the reactant and slows down the reaction. This can to a large extent be overcome and better contact between the reactants secured by the use of an inert solvent such as carbon tetrachloride or chloroform. The reaction can also be speeded up if desired by the use of a catalyst. As catalysts, ferric chloride, stannic chloride, iron, actinic light, ultra violet light or sunlight may be used.

What is claimed is:

1. The method of producing 1,3-diols which comprises treating a meta-dioxane with a halogen in the presence of an aqueous medium in which the ratio of halogen to meta-dioxane is at least 1/1 and the ratio of aqueous medium to meta-dioxane is at least 2/1 on a mol per mol basis, and at a temperature between −50° and +50° C. and recovering the 1,3-diols.

2. The method of producing 2,3-dimethyl-1,3-butanediol which comprises treating 4,4,5-trimethyl meta-dioxane with chlorine gas at a temperature of from 2° to 5° C. in the presence of water in which the ratio of chlorine gas to the meta-dioxane is at least 1/1 and the ratio of water to the meta-dioxane is at least 2/1 on a mol per mol basis, neutralizing the reaction product and vacuum distilling to recover the 2,3-dimethyl-1,3-butanediol.

3. The method of producing 2,3-dimethyl-1,3-butanediol which comprises treating 4,4,5-trimethyl meta-dioxane with chlorine gas at a temperature of from 2°–5° C. in the presence of dilute aqueous alkali and vacuum distilling to recover the 2,3-dimethyl-1,3-butanediol.

4. The method of producing 3-methyl-1,3-butanediol which comprises treating 4,4-dimethyl meta-dioxane with a halogen at a temperature of from 2° to 5° C. in the presence of water, neutralizing the reaction product and vacuum distilling to recover the 3-methyl-1,3-butanediol.

5. The method of producing 3-methyl-1,3-butanediol which comprises treating 4,4-dimethyl meta-dioxane with chlorine gas at a temperature of from 2° to 5° C. in the presence of water, in which the ratio of chlorine gas to the meta-dioxane is at least 1/1 and the ratio of water to meta-dioxane is at least 2/1 on a mol per mol basis, neutralizing the reaction product and vacuum distilling to recover the 3-methyl-1,3-butanediol.

6. The method of producing 1,3-diols which comprises condensing an olefin and an aldehyde in the ratio of one mol of olefin to two mols of formaldehyde in the presence of an acid-reacting catalyst of from 10 to 85% concentration, neutralizing the reaction product of the condensation reaction, adjusting the water content of the neutralized mixture to at least 2 mols of water per mol of olefin-aldehyde condensate, cooling the mixture to slightly below room temperature and passing into the mixture chlorine gas until an amount of chlorine has been absorbed equivalent to one mol of chlorine per mol of olefin-aldehyde condensate, neutralizing the mixture and vacuum distilling to recover the 1,3-diol.

ERVING ARUNDALE.
LOUIS A. MIKESKA.